(12) United States Patent
Weaver

(10) Patent No.: US 6,533,323 B1
(45) Date of Patent: Mar. 18, 2003

(54) TRACTOR QUARTER FENDER

(76) Inventor: Scott D. Weaver, P.O. Box 293, Washington, IL (US) 61571

( * ) Notice: Subject to any disclaimer, the term of this patent is extended or adjusted under 35 U.S.C. 154(b) by 0 days.

(21) Appl. No.: 09/472,531

(22) Filed: Dec. 27, 1999

(51) Int. Cl.[7] ................................................. B62B 9/16
(52) U.S. Cl. ....................... 280/847; 280/848; 280/154; 280/851
(58) Field of Search .................. 280/770, 847, 280/152.1, 152.3, 848, 153.5, 154, 851, 852; 180/84

(56) References Cited

U.S. PATENT DOCUMENTS

| | | | | | |
|---|---|---|---|---|---|
| ,749,866 | A | * | 1/1904 | King | 280/848 |
| 1,178,337 | A | * | 4/1916 | Newton | 280/852 |
| 1,411,254 | A | * | 4/1922 | Braucci | 280/160 |
| 1,680,504 | A | * | 8/1928 | Cutler | 280/848 |
| 1,754,147 | A | * | 4/1930 | Cookson | 280/851 |
| 2,059,869 | A | * | 11/1936 | Holecek | 343/716 |
| 2,831,702 | A | * | 4/1958 | Eaves et al. | 280/851 |
| 2,940,773 | A | * | 6/1960 | Eaves | 280/851 |
| 3,863,729 | A | * | 2/1975 | Von Fummetti | 180/69 R |
| 3,922,003 | A | | 11/1975 | Lea | |
| 4,074,786 | A | * | 2/1978 | Joubert | 180/68.5 |
| 4,114,716 | A | * | 9/1978 | Sanders | 180/68 R |
| 4,148,573 | A | | 4/1979 | Uire | |
| 4,268,053 | A | | 5/1981 | Toppins et al. | |
| 4,357,030 | A | | 11/1982 | Verge | |
| 4,377,294 | A | | 3/1983 | Lockwood et al. | |
| 4,480,845 | A | * | 11/1984 | Hansen | 280/5 A |
| 4,591,178 | A | | 5/1986 | Mortvedt et al. | |
| 4,605,238 | A | * | 8/1986 | Arenhold | 280/154.5 R |
| 4,740,003 | A | | 4/1988 | Antekekeiev | |
| 5,193,869 | A | * | 3/1993 | Land | 293/128 |
| 5,897,802 | A | * | 4/1999 | Jones | 219/202 |
| 5,924,735 | A | * | 7/1999 | Meyer | 280/851 |
| 6,070,893 | A | * | 6/2000 | Thorndyke | 280/160 |

FOREIGN PATENT DOCUMENTS

JP 06073758 * 3/1994

* cited by examiner

Primary Examiner—Brian L. Johnson
Assistant Examiner—Christopher Bottorff
(74) Attorney, Agent, or Firm—Mark E. Wiemelt

(57) ABSTRACT

A quarter fender (10) is adapted to mount on a tractor (12) comprising an arcuate top panel (20), a bottom panel (22) that is wider than the top panel (20), and an attachment member (24); the top panel (20) being connected to the bottom panel (22) and secured at its convex back side (36) to the attachment member (24) such that the concave front side (34) of the top panel (20) is facing the front wheel (16) of the tractor (12); the attachment member (24) is further mounted to a step portion (68) of the tractor (12). The quarter fender (10) of the present invention prevents mud, debris and hard objects from being thrown upward and backward to soil or damage the cab (18) and tractor body (14).

9 Claims, 5 Drawing Sheets

TRACTOR QUARTER FENDER

BACKGROUND OF THE INVENTION

1. Field of the Invention

The present invention relates to fenders used to protect the body of a vehicle from being splashed with mud and dirt due to the rotation of tires in contact with the road. More specifically, the invention is directed to a quarter fender to be used with tractors in which the fender protects the body and cab of the tractor from mud and debris thrown upward from the contact of the front wheels rotating on the ground.

2. Description of the Related Art

Mud flaps and deflector shields exist in the art for vehicles of all kinds. The conventional shields are directly attached to the bottom of the vehicle without a need for a separate means of attachment. Such is the case for most automobiles. However, these types of shields are not practical for farm tractors and the like because the shields cannot readily be directly attached to the body of the tractor. It is also impractical because the goal of deflector shields used on tractors is to protect the cab, not just the body of the tractor.

Thus, the shields or fenders (or quarter fenders) presently used on tractors are attached thereto by means or devices positioned perpendicular to both the side surface of the tractor body and the longitudinal length of the shield. Usually, these fenders are not attached to the tractors until after the purchase of the tractor, i.e., "after-market" quarter fenders. The major disadvantage of this conventional attachment is that the attaching device would become dirty just like the bottom side of the shield facing the wheel. This increases the burden of cleaning both the shield and the attachment means.

Additionally, most deflector shields used on tractors only prevent objects on the ground from projecting upward to contact the cab. While this is one main objective of having shields, this type of conventional shield does not take into account the projection of objects from the front wheels that hit other surfaces of the tractor which are lower than the cab, such as the step portion usually located directly underneath the cab. A lower deflector shield would prevent hard objects from causing damage to the step portion or the tractor body.

Hence, there is a need in the art for a shield attachment device or means that does not itself become dirty when objects are splashed upward from the front wheels of tractors. There is also a need in the art for a shield that accomplishes the dual purpose of protecting the cab of the tractor and the lower body surfaces of the tractor.

It is a primary object of the instant invention to provide a fender capable of remedying the failures of existing deflector shields used for tractors.

A further object of the present invention is a quarter fender that more effectively prevents objects from projecting upward to contact the cab of a tractor.

Another object of the instant invention is a quarter fender that protects the tractor body from being contacted by objects thrown upward and backwards from the rotating front wheels.

A further object of the present invention is a quarter fender having an attachment means that is itself not contacted by objects thrown upward from the rotating front wheels of a tractor.

Another object of the instant invention is a quarter fender that is easy to attach to and detach from the tractor, so as to be a quick attachment apparatus.

These together with other objects of the invention, along with the various features of novelty which characterize the invention, are pointed out with particularity in the detailed description annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF SUMMARY OF THE INVENTION

A broad aspect of the invention comprises a novel quarter fender and attachment means therefor. One embodiment of the invention utilizes an arcuate rectangular top panel, a rectangular bottom panel secured to the top panel, and means for attaching the two panels to a step portion of the tractor located behind the front wheels and underneath the cab. In this embodiment, the top panel has a width that is about as wide as the width of a front wheel. The bottom panel has a width that is wider than that of the top panel such that its inner edge is nearly flush with the outer surface of the tractor body. The two panels prevent objects from projecting upward and backwards from the rotating front tires to contact the cab and the tractor body. The panels also protect the attachment means from being hit with such projected objects because the attachment means is located behind the panels. An inventive feature of this invention is that the attachment means secures the top and bottom panels—collectively the "quarter fender"—to the step portion of the tractor.

For this embodiment, it is most advantageous for the top panel to be positioned so that its top edge is directly above the vertical axis of the front wheel to provide optimal protection for the cab. It is also beneficial for the bottom edge of the bottom panel to be flush with the bottom edge of the step portion to protect the lower portions of the tractor body.

Another embodiment of the present invention is using a single panel as a quarter fender. This embodiment would achieve the same result as the prior embodiment.

A further embodiment of the instant invention is the attachment means used to attach the quarter fender to the step portion of the tractor. A novel attachment means disclosed in this invention is the use of a bracket member and two L-shaped bars to secure the quarter fender to the step portion. The bracket and two bars can be made of metallic or other substances. This embodiment can be used with either the two-panel (i.e., top and bottom panels) or the single-panel configuration.

There has thus been outlined, rather broadly, the more important features of the invention in order that the detailed description thereof that follows may be better understood, and in order that the present contribution to the art may be better appreciated. There are, of course, additional features of the invention that will be described hereinafter and that will form the subject matter of the invention. Those skilled in the art will appreciate that the conception, upon which this disclosure is based, may readily be utilized as a basis for the designing of other devices for carrying out the several purposes of the present invention. It is important, therefore, that the invention be regarded as including such equivalent constructions insofar as they do not depart from the spirit and scope of the present disclosure.

BRIEF DESCRIPTION OF THE SEVERAL VIEWS OF THE DRAWINGS

The foregoing and other additional objects of the present invention will be readily appreciated by those skilled in the art upon gaining an understanding of the invention as described in the following detailed description and shown in the accompanying drawings in which.

DETAILED DESCRIPTION OF THE INVENTION

Figure 1:
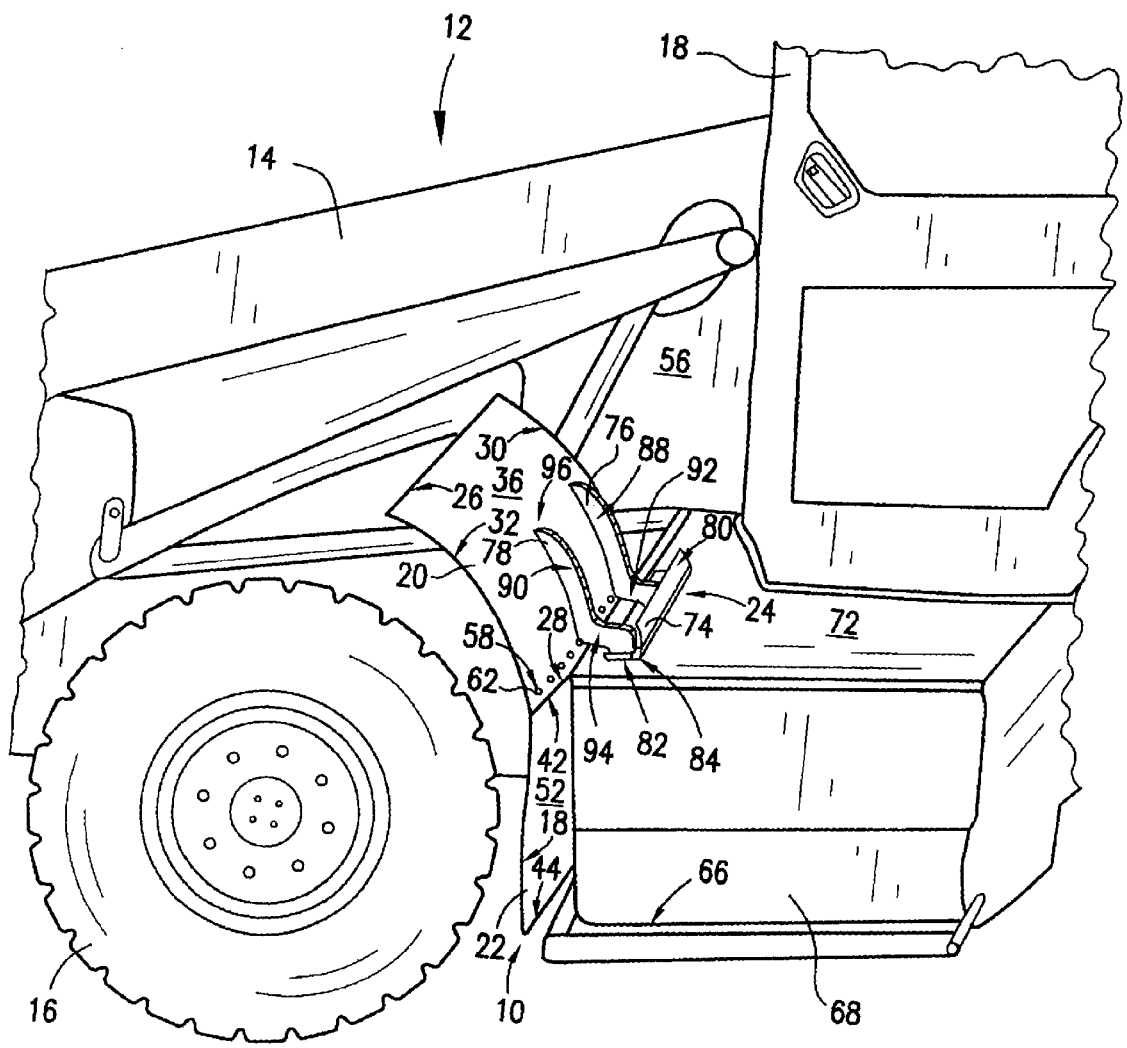
FIG. 1 is a perspective view of the quarter fender of the present invention as it used for a left-sided front wheel of a tractor.

While the invention may be susceptible to embodiments in different forms, there is shown in the drawings, and herein will be described in detail, specific embodiments with the understanding that the present disclosure is to be considered an exemplification of the principles of the invention, and is not intended to limit the invention to that as illustrated and described herein.

Referring to the drawings, FIG. 1 shows a quarter fender generally as 10, a tractor generally as 12, the tractor body 14, one front wheel 16 of the tractor 12, and the cab 18. The quarter fender 10 in this embodiment has a top panel 20, a bottom panel 22 and an attachment means shown generally as 24.

The top panel 20 is most preferably arcuate, planar and substantially rectangular in shape with a top edge 26, a bottom edge 28, an inner edge 30 and an outer edge 32. Further, the shape of the top panel 20 should embody a concave front side 34 (shown in FIG. 2) and a convex back side 36, such that the concave front side 34 should face the front wheel 16 when mounted as described herein. The width 38 (shown in FIG. 2) of the top panel 20 should be approximately as wide as the width 40 (shown in FIG. 2) of the front wheel 16. The top panel 20 can be made of metal or plastic. It is most preferable that the top panel 20 comprise of a metallic substance.

In this embodiment, the bottom panel 22 should also be planar, substantially rectangular and have a top edge 42, a bottom edge 44, an inner edge 46, an outer edge 48, a front side 50 (shown in FIG. 2) and a back side 52. The bottom panel 22 can be made of metal, plastic or rubber. It is most preferred that the bottom panel 22 comprise of a plastic substance. The width 54 (shown in FIG. 2) of the bottom panel 22 should be about one-third wider than the width 38 of the top panel 20. This is to allow for the inner edge 46 of the bottom panel 22 to be flush with the outer surface 56 of the tractor body 14. A most preferred embodiment would align the outer edge 48 of the bottom panel 22 with the outer edge 32 of the top panel 20 to ensure that the wider bottom panel 22 will be flush with the outer surface 56 of the tractor body 14. However, the alignment of the outer edges 32 and 48 of the top panel 20 and the bottom panel 22, respectively, is not absolutely required.

The top panel 20 and the bottom panel 22 are preferably secured together so that the bottom edge 28 of the top panel 20 is removably secured to the top edge 42 of the bottom panel 22. It is most preferred in this embodiment that the bottom edge 28 of the top panel 20 have a plurality of horizontal holes 58 and that the top edge 42 of the bottom panel 22 also have a plurality of horizontal holes 60 (shown in more detail in FIG. 2). In this way, when the bottom edge 28 of the top panel 20 overlaps the top edge 42 of the bottom panel 22, the plurality of horizontal holes 58 and 60 of each panel will be aligned for passage of threaded bolts 62 therethrough. The plurality of threaded bolts 62 is inserted horizontally into the plurality of holes 58 and 60 to removably secure the two panels 20 and 22 to each other. The exact number of holes 58 and 60 and bolts 62 is not of paramount importance, but it is common sensical that the number of holes 58 and 60 should match the number of bolts 62 used therefor.

Once secured in this fashion, the top edge 26 of the top panel 20 should be aligned over the vertical axis 64 (not shown) of the front wheel 16 to optimally prevent mud and other debris (not shown) from splashing onto the cab 18 of the tractor 12. Likewise, the bottom edge 44 of the bottom panel 22 should be approximately aligned with the bottom edge 66 of the step portion 68 of the tractor 12. This step portion 68 is typically located under the cab 18 and behind the front wheel 16 of the tractor 12. In this way, the bottom panel 22 will provide optimal protection for the tractor body 14 and the step portion 68 against mud or other debris (not shown) splashed backward from the rotating front wheel 16.

The attachment means 24 is utilized to mount or attach the quarter fender 10 to the step portion 68. In this embodiment, this is most preferably accomplished by securing the attachment means 24 to the convex back side 36 of the top panel 20. As indicated previously, the attachment means 24 will allow the concave front side 34 (shown in FIG. 2) of the top panel 20 to face toward the front wheel 16. The preferred attachment means 24 is, firstly, the use of a step portion 68 having a plurality of threaded vertical holes 70 (shown in more detail in FIG. 3) on the top surface 72 of the step portion 68 nearest the front wheel 16. Further, the preferred attachment means 24 has a horizontal bracket member 74 and two L-shaped bars 76 and 78.

The bracket member 74 has a vertically extending member 80 and a horizontally extending member 82 that come together lengthwise to form a perpendicular corner edge 84 of the bracket member 74. The bracket member 74 most preferably has a length 86 (not shown) that is about the same as the width 38 of the top panel 20. As a result, the vertically extending member 80 and the horizontally extending member 82 of the bracket member 74 should have the same length (not shown) as the bracket member 74 itself. The horizontally extending member 82 of the bracket member 74 is secured to the top surface 72 of the step portion 68 (shown in more detail in FIG. 3) so that the bracket member 74 faces the convex back side 36 of the top panel 20 and the vertically extending member 80 of the bracket member 74 projects upwardly in a direction that is perpendicular to the top surface 72 of the step portion 68.

Still referring to FIG. 1, the two L-shaped bars 76 and 78 comprise an inner bar 76 and an outer bar 78. Each of the inner 76 and outer 78 bars have a longer vertical branch 88 and 90, respectively, and a shorter horizontal branch 92 and 94, respectively. The longer vertical branches 88 and 90 are arcuately shaped to match the convex back side 36 of the top panel 20 and is removably secured thereto (shown in more detail in FIG. 3). This results in the longer vertical branch 88 of the inner bar 76 being secured near the inner edge 30 of the convex back side 36 of the top panel 20, while the longer vertical branch 90 of the outer bar 78 is secured near the middle portion 96 of the convex back side 36 of the top panel 20. The shorter horizontal branches 92 and 94 are removably secured to the horizontally extending member 82 of the bracket member 74 (shown in more detail in FIG. 3).

The bracket member 74 and the L-shaped bars 76 and 78 of this embodiment can be made of any type of metal, such as aluminum or steel. The bracket member 74 and bars 76 and 78 can also be made of a plastic or polymer material. One of skill in the art would readily comprehend the appropriate materials and ways to make these parts.

Once the quarter fender 10 is attached to the step portion 68 of the tractor 12, as shown in FIG. 1, its novel advantages will become apparent. For one, the present invention prevents mud, other debris and hard objects from being thrown upward and backward to contact the cab 18 and the tractor body 14. Thus employed, the quarter fender 10 would prevent damage and soiling of the cab 18 and tractor body 14. The two-panel structure disclosed herein is especially effective for this objective. Also, the location of the attachment means 24 behind the panels, 20 and 22, of the quarter fender 10 lessens the clean-up time and effort because the attachment means 24 will not be soiled or contacted by mud or other debris being thrown upward and backward from the rotating front wheel 16. This is favorable over prior art deflector shields which do not take into account this novel time-and effort-saving attachment means 24. Additionally, the location of the attachment means 24 prevents it from being damaged by hard objects thrown backwards from the rotating front wheel 16.

Figure 2:
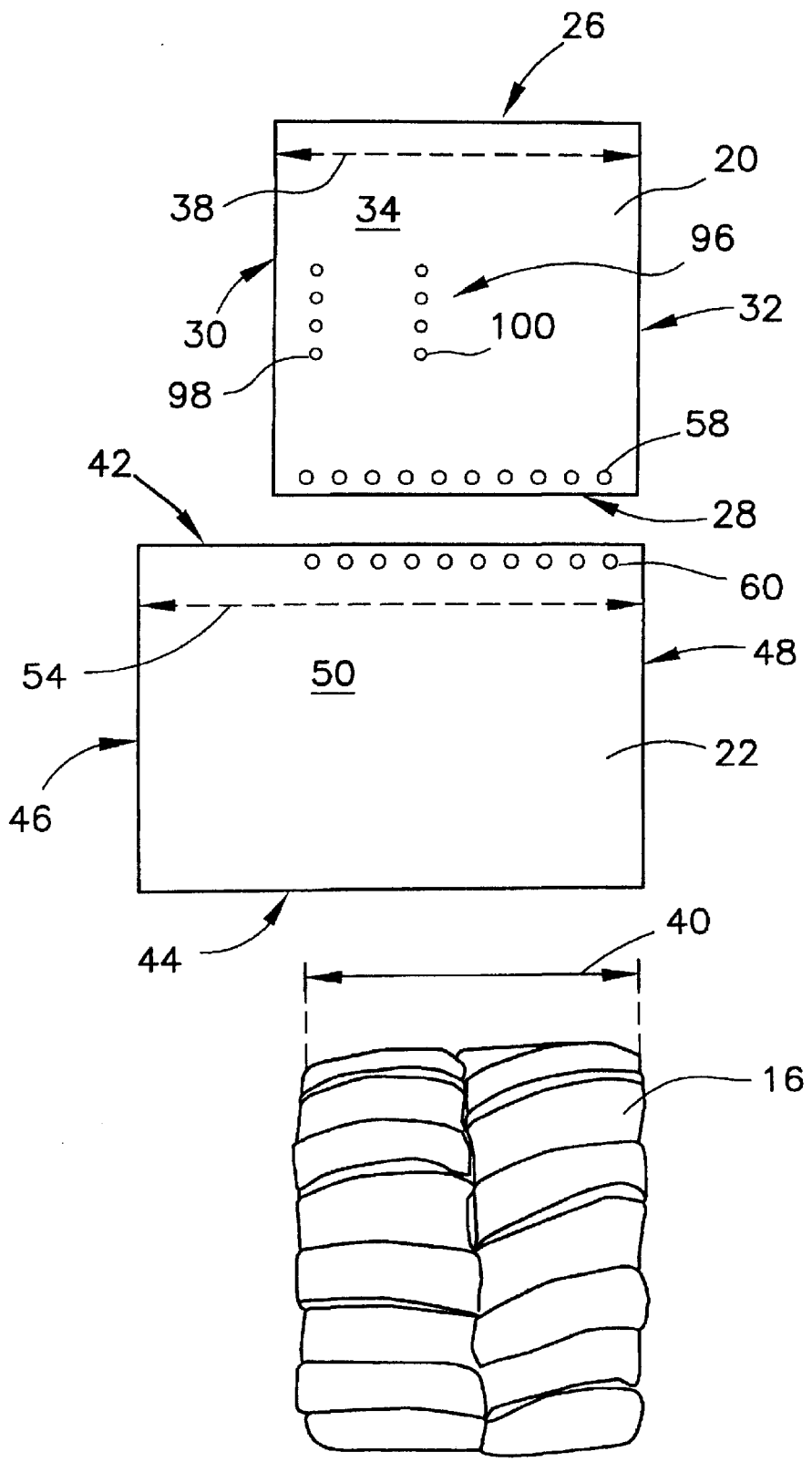
FIG. 2 is front view of the top panel and the bottom panel, and a comparison therebetween of their respective widths, before each would be removably secured to the other in one embodiment of the instant invention.
Figure 3:
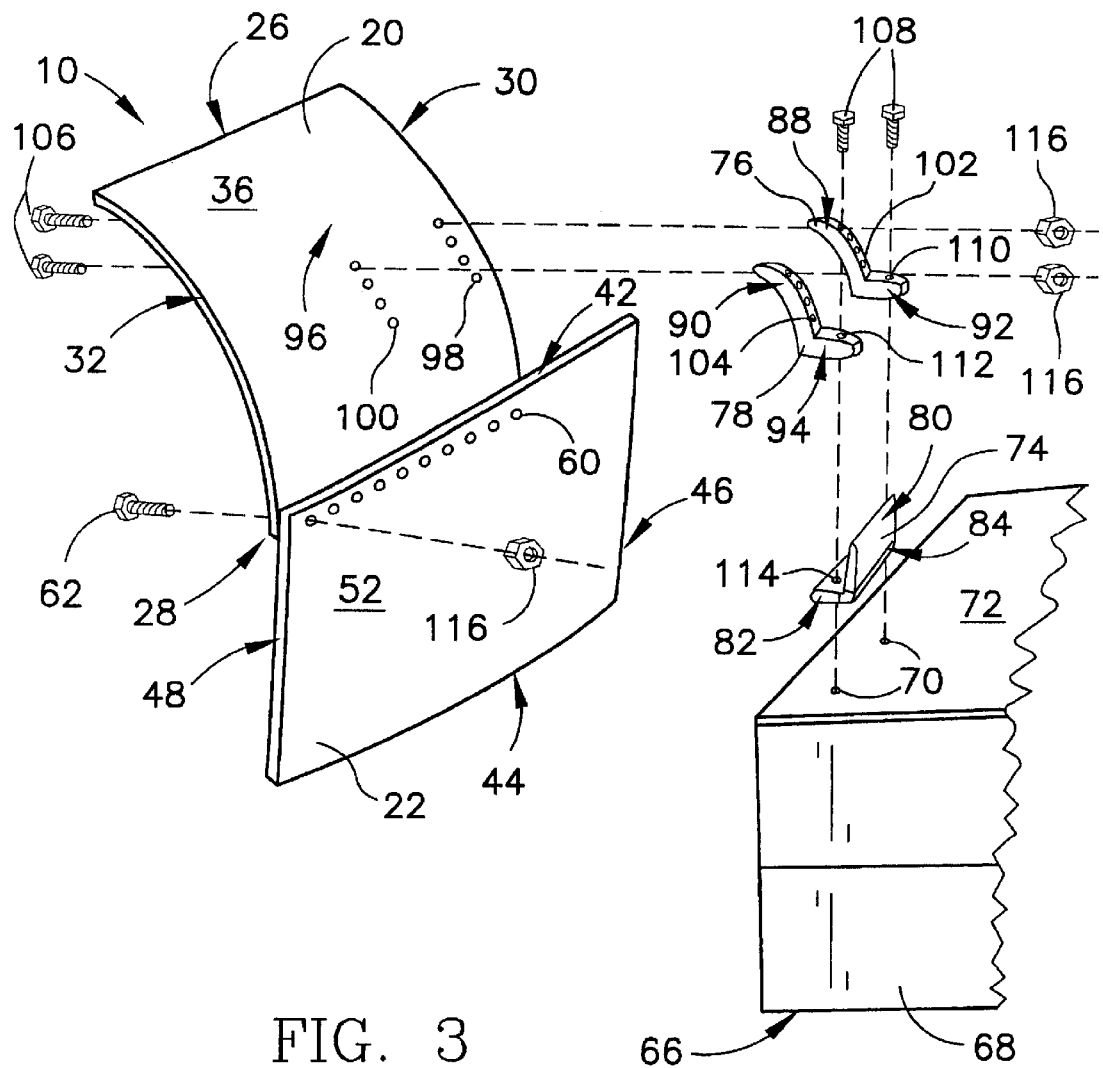
FIG. 3 is an exploded view of a preferred embodiment of the quarter fender and its novel attachment means.

FIG. 2 depicts the front view of both the top panel 20 and the bottom panel 22 before the two panels 20 and 22 are removably secured together. In this view, the width 34 of the top panel 20 can be more easily compared to the width 54 of the bottom panel 22, which is visibly wider than the top panel 20, and the width 40 of the front wheel 16. Additionally, this view shows the horizontal holes 58 proximate the bottom edge 28 of the top panel 20 in alignment with the horizontal holes 60 proximate the top edge 42 of the bottom panel 22. FIG. 2 also shows the top panel 20 having two sets of vertically aligned horizontal apertures 98 and 100. The apertures 98 near the inner edge 30 of the top panel 20 are for securing the inner bar 76 of the attachment means 24, as shown in FIG. 3. Similarly, the apertures 100 near the middle portion 96 of the top panel 20 are for securing the outer bar 78 of the attachment means 24, also shown in FIG. 3.

FIG. 3 is an exploded view which shows that once the bottom edge 28 of the top panel 20 overlaps with the top edge 42 of the bottom panel 22, threaded bolts 62 may be inserted through the aligned holes 58 and 60 to removably secured the panels 20 and 22 together. This figure also shows another preferred embodiment of the attachment means 24, whereby the top panel 20 has a plurality of horizontal apertures 98 and 100 aligned vertically near the inner edge 30 and the middle portion 96, respectively, of the top panel 22. This attachment means 24 further utilizes two L-shaped bars 76 and 78 having a plurality of horizontal threaded holes 102 and 104 vertically aligned through the longer vertical branches 80 and 82, respectively, of the inner 76 and outer bars 78. The plurality of horizontal threaded holes 102 and 104 of the inner 76 and outer 78 L-shaped bars match up with the plurality of vertically-aligned horizontal apertures 98 and 100 of the top panel. This allows a plurality of threaded bolts 106 to be inserted from the concave front side 34 (not shown) of the top panel 20 through the vertically-aligned horizontal apertures 98 and 100 thereof and into the plurality of horizontal threaded holes 102 and 104, respectively, of the inner 76 and outer 78 L-shaped bars to removably secure the top panel 20 thereto.

Next, FIG. 3 shows how, in this preferred embodiment of the attachment means 24, the inner 76 and outer 78 bars are secured to the bracket member 74 which is, in turn, secured to the step portion 68. In particular, each of the shorter horizontal branches 92 and 94 of the inner 76 and outer 78 bars have threaded vertical holes 110 and 112, respectively, therethrough. These vertical holes 110 and 112 are matched with the plurality of threaded vertical holes 114 of the horizontally extending member 82 of the bracket member 74 which are further matched with the plurality of threaded vertical holes 70 of the top surface 72 of the step portion 68; this allows a plurality of threaded bolts 108 to be inserted into the aligned threaded vertical holes 110, 112, 114 and 70 to secure the attachment means 24 to the step portion 68. One of skill in the art will find it readily apparent that threaded nuts 116 can be used to better secure the aforementioned threaded bolts 62, 106, and 108.

Figure 4:
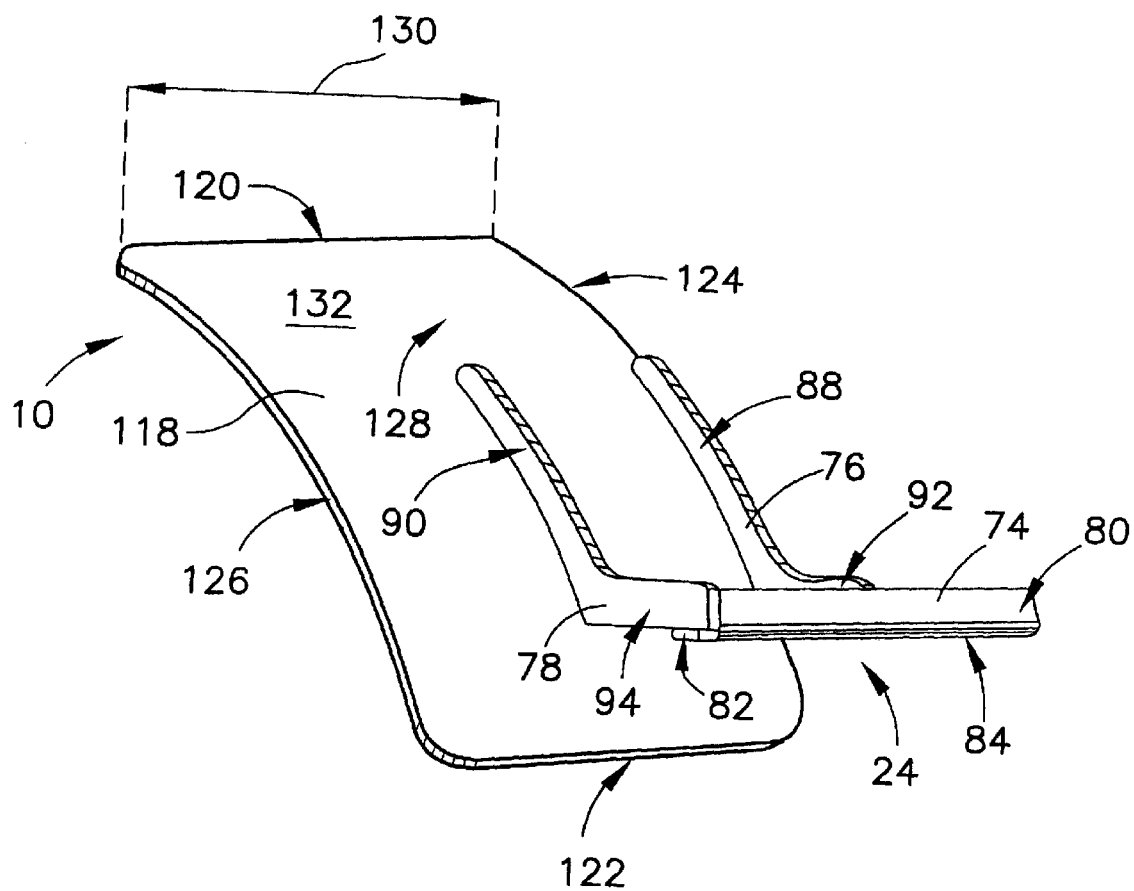
FIG. 4 is a perspective view of a second embodiment of the quarter fender.

FIG. 4 shows another embodiment of the present invention in which a single panel 118 is used to form the quarter fender 10. This panel 118 is preferably arcuate, planar and substantially rectangular in shape. The panel 118 has a top edge 120, a bottom edge 122, an inner edge 124 proximate to the tractor body 14 (not shown), an outer edge 126 and a middle portion 128. The width 130 of the panel 118 should be approximately the same as the width 40 of the front wheel 16 (not shown). Like the previous embodiment, the panel 118 has concave front side 132 (not shown) and a convex back side 132. This panel 118 is effective in preventing mud and other debris from contacting the cab 18 of the tractor 12.

The attachment means 24 shown in FIG. 4 is similar to the attachment means 24 shown in FIGS. 1 and 3, except FIG. 4 depicts a different means of securing the convex back side 134 of the panel 118 to the L-shaped bars 76 and 78. Here, an adhesive 136 (not shown) may be placed between the point of contact where the back side 134 of the panel 118 meets the longer vertical branches 88 and 90 of the inner 76 and outer 78 bars, respectively. Alternatively, the longer vertical branches 88 and 90 of the inner 76 and outer 78 bars, respectively, may be welded (not shown) to the convex back side 134 of the panel 118. If welding is used, it necessarily follows that the panel 118 and the L-shaped bars 76 and 78 must be made of materials capable of withstanding the heat utilized in the melding process. Such materials are known to one of skill in the art, but may include metallic and iron substances. The welding and adhesive 136 means disclosed here may also be adapted for use with other embodiments of the quarter fender 10 as discussed previously and hereafter.

Figure 5:
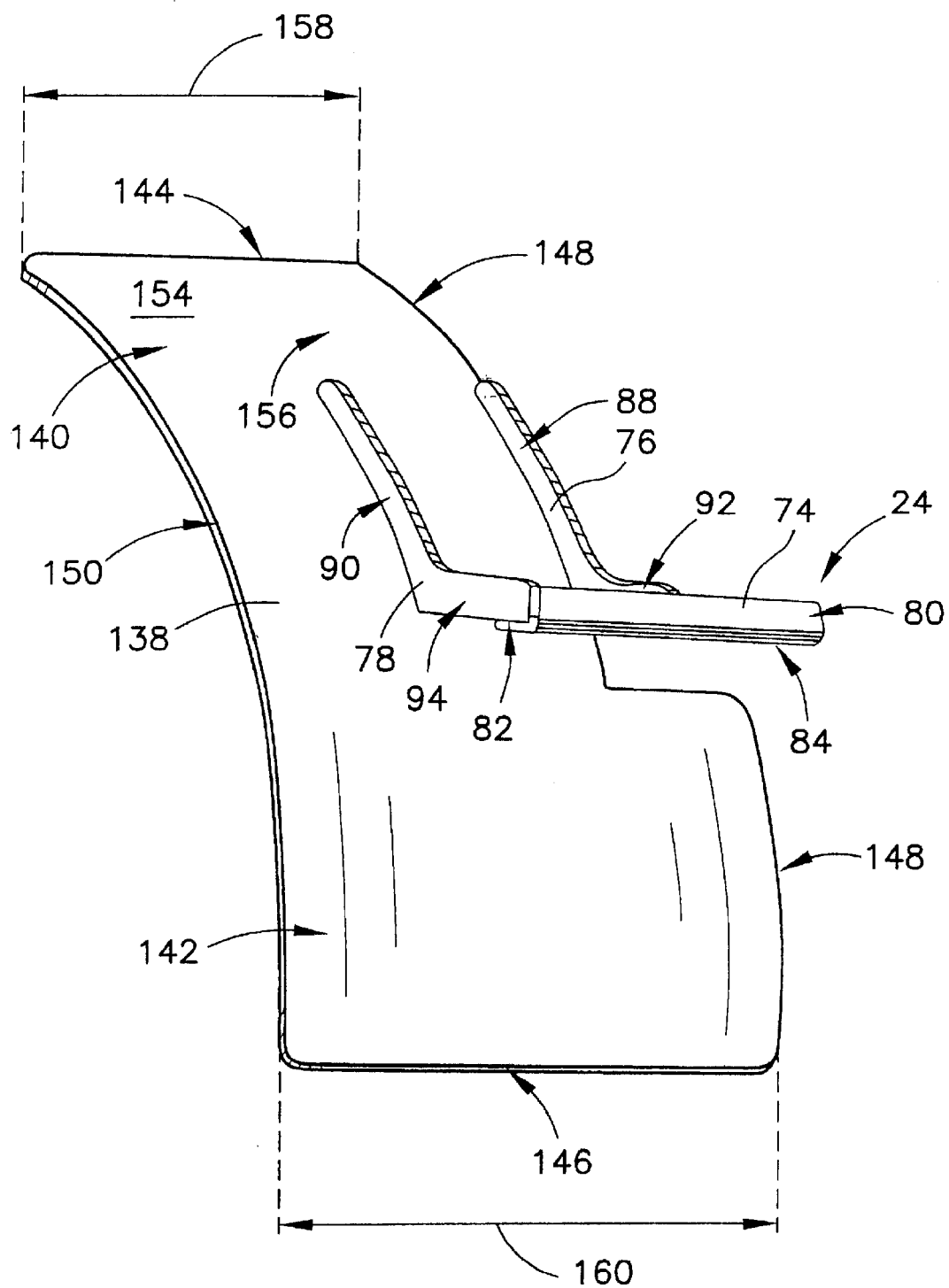
FIG. 5 is a perspective view of a third embodiment of the quarter fender.

FIG. 5 shows another embodiment of the quarter fender 10. In this embodiment, an arcuate planar substantially rectangular panel 138 has a top half 140, a bottom half 142, a top edge 144, a bottom edge 146, an inner edge 148, an outer edge 150, a concave front side 152 (not shown), a convex back side 154, and a middle portion 156. The width 158 of the top half 140 of the panel 138 should be approximately the same as the width 40 of the front wheel 16 (not shown). But, the width 160 of the bottom half 142 of the panel 138 should be about one-third wider than the width 158 of the top half 140 of the panel 138, so that the inner edge 148 of the bottom half 142 of the panel 138 is approximately flush with the tractor body 14. The vertical length 162 (not shown) of the panel 138 of this embodiment should preferably extend from, at its top edge 144, the vertical axis 64 of the front wheel 16 (not shown) to, at its bottom edge 146, become level or flush with the bottom edge 66 of the step portion 68 (not shown). The panel 138 is preferably constructed of materials similar to those disclosed above.

The fully assembled quarter fender 10 of this embodiment also results in the concave front side 152 of the panel 138 facing the front wheel 16 of the tractor 12. This embodiment achieves the same objectives as disclosed above in preventing mud, debris and hard objects from soiling and damaging the cab 18 of the tractor 12, the tractor body 14 and the attachment means 24, which is located directly behind the convex back side 154 of the panel 138.

While the invention has been described in connection with a preferred embodiment, it will be understood that it is not intended that the invention be limited to that embodiment. On the contrary, it is intended to cover all alternatives, modifications and equivalents as may be included within the spirit and scope of the invention as disclosed.

As to the manner of usage and operation of the instant invention, same should be apparent from the above disclosure, and accordingly no further discussion relevant to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered illustrative of only the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The foregoing discussion is illustrative of the invention. However, since many embodiments of the invention can be made without departing from the spirit and scope of the invention, the invention resides wholly in the claims hereinafter appended.

What is claimed is:

1. A quarter fender adapted for use with a tractor having at least one front wheel, a tractor body, a cab and a step portion, the front wheel having a specified width and a vertical axis, the tractor body having an outer surface, the step portion located behind the front wheel and beneath the cab and having a top surface and a bottom edge, the quarter fender preventing mud and other debris from splashing behind the front wheel onto the tractor body and the cab, the quarter fender comprising:

(a) an arcuate planar substantially rectangular top panel having a top edge, a bottom edge, an inner edge proximate to the tractor body, an outer edge and a middle portion, the top panel having a width sufficient to approximately span across the specified width of the front wheel, the top panel further having a concave front side and a convex back side;

(b) a planar substantially rectangular bottom panel having a top edge, a bottom edge, an inner edge proximate to the tractor body, an outer edge, a front side and a back side, the bottom panel having a width extending wider than the width of the top panel whereby the inner edge of the bottom panel is level with the outer surface of the tractor body proximate the front wheel, the top edge of the bottom panel being secured to the bottom edge of the top panel; and (c) means for attaching the top panel of the quarter fender to the step portion, whereby the quarter fender is adapted to be attached to the step portion such that the concave front side of the top panel faces the front wheel, the means for attaching the top panel of the quarter fender to the step portion comprises, the top surface of the step portion having a plurality of threaded vertical holes proximate the front wheel, a horizontal bracket member having a vertically extending member and a horizontally extending member, the vertically and horizontally extending members coming together lengthwise to form a perpendicular corner edge of the bracket member, the bracket member having a length approximately equal to the width of the top panel, the vertically and horizontally extending members spanning the length of the bracket member, the horizontally extending member having a plurality of threaded vertical holes therethrough, the horizontally extending member resting on the top surface of the step portion such that the bracket member faces the convex back side of the top panel and the vertically extending member projects upwardly in a direction perpendicular to the top surface of the step portion, whereby the plurality of threaded vertical holes of the horizontally extending member are aligned with the plurality of threaded vertical holes of the top surface of the step portion, two L-shaped bars comprising an inner bar and an outer bar, the bars each having a longer vertical branch and a shorter horizontal branch, the shorter horizontal branch having a threaded vertical hole therethrough, the longer vertical branch having an arcuate shape to match the shape of the convex back side of the top panel, whereby the threaded vertical holes of the shorter horizontal branches are aligned with the plurality of threaded vertical holes of the horizontally extending member of the bracket member, a plurality of threaded bolts, a means for securing the longer vertical branch of the inner bar to the convex back side of the top panel near the inner edge thereof and proximate the tractor body, and a means for securing the longer vertical branch of the outer bar to the convex back side of the top panel near the middle portion thereof, whereby two of the threaded bolts are inserted through each of the aligned threaded holes to removably secure the shorter horizontal branches of the bars to the horizontally extending member of the bracket member to the top surface of the step portion.

2. The quarter fender of claim 1 wherein the means for securing each of the longer vertical branches of the outer and inner bars to the convex back side of the panel comprises an adhesive, the adhesive being placed between the convex back side of the panel and each of the longer vertical branches of the outer bar and the inner bar.

3. The quarter fender of claim 1 wherein the means for securing each of the longer vertical branches of the outer and inner bars to the convex back side of the panel comprises:

(a) a plurality of threaded bolts;

(b) the panel having a plurality of horizontal apertures therethrough, the apertures being located to vertically align with the longer vertical branches of the outer and inner bars when secured to the convex back side of the panel, the plurality of thread bolts adapted for insertion through the apertures from the concave front side of the panel toward the step portion; and (c) the longer vertical branches of the outer and inner bars having a plurality of threaded horizontal holes therethrough, the holes of the longer vertical branches adapted to receive the plurality of threaded bolts already inserted in the panel, whereby the plurality of threaded bolts removably secures the panel to the longer vertical branches of the outer and inner bars.

4. A quarter fender adapted for use with a tractor having at least one front wheel, a tractor body, a cab and a step portion, the front wheel having a specified width and a vertical axis, the tractor body having an outer surface, the step portion located behind the front wheel and beneath the cab and having a top surface and a bottom edge, the quarter fender preventing mud and other debris from splashing behind the front wheel onto the tractor body and the cab, the quarter fender comprising:

(a) an arcuate planar substantially rectangular panel having a top half, a bottom half, a top edge, a bottom edge, an inner edge proximate to the tractor body, an outer edge and a middle portion, the top half having a width sufficient to approximately span across the specified width of the front wheel, the bottom half having a width extending wider than the width of the top half whereby the inner edge of the bottom half of the panel is level with the outer surface of the tractor body proximate the front wheel, the panel further having a concave front side and a convex back side;

(b) means for attaching the panel to the step portion, whereby the quarter fender is adapted to be attached to the step portion such that the concave front side of the panel faces the front wheel, the means for attaching the panel to the step portion comprises the top surface of the step portion having a plurality of threaded vertical holes proximate the front wheel, a horizontal bracket member having a vertically extending member and a horizontally extending member, the vertically and horizontally extending members coming together lengthwise to form a perpendicular corner edge of the bracket member, the bracket member having a length approximately equal to the width of the top half of the panel, the vertically and horizontally extending members spanning the length of the bracket member, the horizontally extending member having a plurality of threaded vertical holes therethrough, the horizontally extending member resting on the top surface of the step portion such that the bracket member faces the convex back side of the panel and the vertically extending member projects upwardly in a direction perpendicular to the top surface of the step portion, whereby the plurality of threaded vertical holes of the horizontally extending member are aligned with the plurality of threaded vertical holes of the top surface of the step portion, two L-shaped bars comprising an inner bar and an outer bar, the bars each having a longer vertical branch and a shorter horizontal branch, the shorter horizontal branch having a threaded vertical hole therethrough, the longer vertical branch having an arcuate shape to match the shape of the convex back side of the panel, whereby the threaded vertical holes of the shorter horizontal branches are aligned with the plurality of threaded vertical holes of the horizontally extending member of the bracket member, a plurality of threaded bolts, means for securing the longer vertical branch of the inner bar to the convex back side of the panel near the inner edge thereof and proximate the tractor body, and means for securing the longer vertical branch of the outer bar to the convex back side of the panel near the middle portion thereof, whereby two of the threaded bolts are inserted through each of the aligned threaded holes to removably secure the shorter horizontal branches of the bars to the horizontally extending member of the bracket member to the top surface of the step portion.

5. The quarter fender of claim 4 wherein the means for securing each of the longer vertical branches of the outer and inner bars to the convex back side of the top panel comprise an adhesive, the adhesive being placed between the convex back side of the top panel and each of the longer vertical branches of the outer bar and the inner bar.

6. The quarter fender of claim 4 wherein the means for securing each of the longer vertical branches of the outer and inner bars to the convex back side of the top panel comprises:

(a) a plurality of threaded bolts;

(b) the top panel having a plurality of horizontal apertures therethrough, the apertures being located to vertically align with the longer vertical branches of the outer and inner bars when secured to the convex back side of the top panel, the plurality of thread bolts adapted for insertion through the apertures from the concave front side of the top panel toward the step portion; and (c) the longer vertical branches of the outer and inner bars having a plurality of threaded horizontal holes therethrough, the holes of the longer vertical branches adapted to receive the plurality of threaded bolts already inserted in the top panel, whereby the plurality of threaded bolts removably secures the top panel to the longer vertical branches of the outer and inner bars.

7. A quarter fender adapted for use with a tractor having at least one front wheel, a tractor body, a cab and a step portion, the front wheel having a specified width and a vertical axis, the tractor body having an outer surface, the step portion located behind the front wheel and beneath the cab and having a top surface, the quarter fender preventing mud and other debris from splashing behind the front wheel onto the tractor body and the cab, the quarter fender comprising:

(a) an arcuate planar substantially rectangular panel having a top edge, a bottom edge, an inner edge proximate to the tractor body, an outer edge and a middle portion, the panel having a width sufficient to approximately span across the specified width of the front wheel, the panel further having a concave front side and a convex back side, wherein the panel has a longitudinal length whereby the top edge of the panel is aligned approximately directly above the vertical axis of the front wheel and the bottom edge of the panel is approximately below the top surface of the step portion; and (b) means for attaching the panel to the step portion, whereby the quarter fender is adapted to be attached to the step portion such that the concave front side of the panel faces the front wheel, the means for attaching the panel to the step portion comprises, the top surface of the step portion having a plurality of threaded vertical holes proximate the front wheel, a horizontal bracket member having a vertically extending member and a horizontally extending member, the vertically and horizontally extending members coming together lengthwise to form a perpendicular corner edge of the bracket member, the bracket member having a length approximately equal to the width of the panel, the vertically and horizontally extending members spanning the length of the bracket member, the horizontally extending member having a plurality of threaded vertical holes therethrough, the horizontally extending member resting on the top surface of the step portion such that the bracket member faces the convex back side of the panel and the vertically extending member projects upwardly in a direction perpendicular to the top surface of the step portion, whereby the plurality of threaded vertical holes of the horizontally extending member are aligned with the plurality of threaded vertical holes of the top surface of the step portion, two L-shaped bars comprising an inner bar and an outer bar, the bars each having a longer vertical branch and a shorter horizontal branch, the shorter horizontal branch having a threaded vertical hole therethrough, the longer vertical branch having an arcuate shape to match the shape of the convex back side of the panel, whereby the threaded vertical holes of the shorter horizontal branches are aligned with the plurality of threaded vertical holes of the horizontally extending member of the bracket member, a plurality of threaded bolts, means for securing the longer vertical branch of the inner bar to the convex back side of the panel near the inner edge thereof and proximate the tractor body, and means for securing the longer vertical branch of the outer bar to the convex back of the panel near the middle portion thereof, whereby two of the threaded bolts are inserted through each of the aligned threaded holes to removably secure the shorter horizontal branches of the bars to the horizontally extending member of the bracket member to the top surface of the step portion.

8. The quarter fender of claim 7 wherein the means for securing each of the longer vertical branches of the outer and inner bars to the convex back side of the panel comprises an adhesive, the adhesive being placed between the convex back side of the panel and each of the longer vertical branches of the outer bar and the inner bar.

9. The quarter fender of claim 7 wherein the means for securing each of the longer vertical branches of the outer and inner bars to the convex back side of the panel comprises:

(a) a plurality of threaded bolts;

(b) the panel having a plurality of horizontal apertures therethrough, the apertures being located to vertically align with the longer vertical branches of the outer and inner bars when secured to the convex back side of the panel, the plurality of thread bolts adapted for insertion through the apertures from the concave front side of the panel toward the step portion; and (c) the longer vertical branches of the outer and inner bars having a plurality of threaded horizontal holes therethrough, the holes of the longer vertical branches adapted to receive the plurality of threaded bolts already inserted in the panel, whereby the plurality of threaded bolts removably secures the panel to the longer vertical branches of the outer and inner bars.

* * * * *